Feb. 26, 1935.  M. W. McCONKEY  1,992,226
BRAKE
Filed June 18, 1928
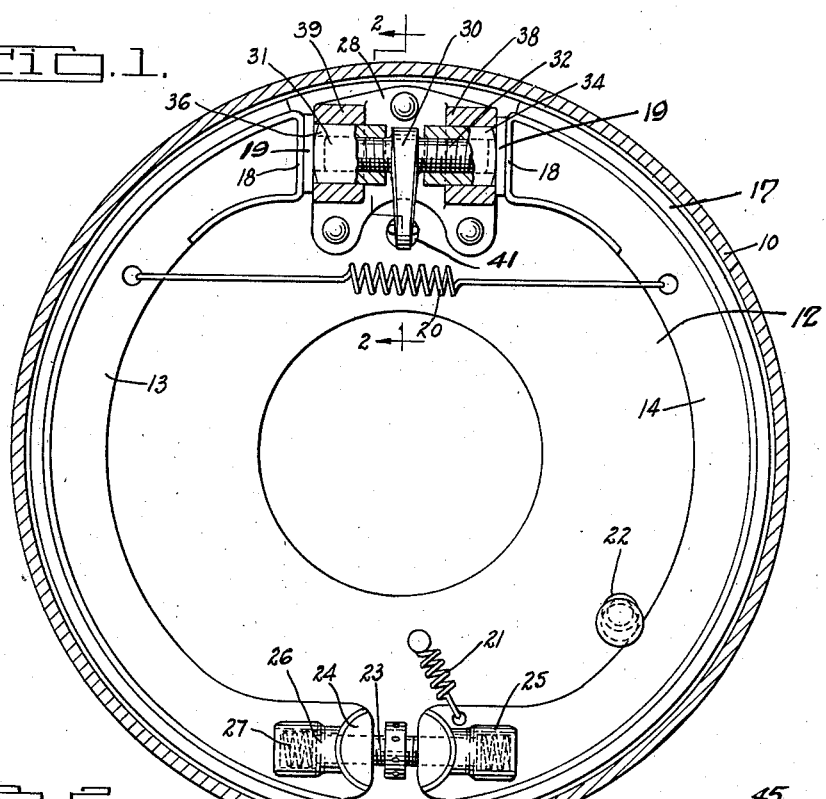
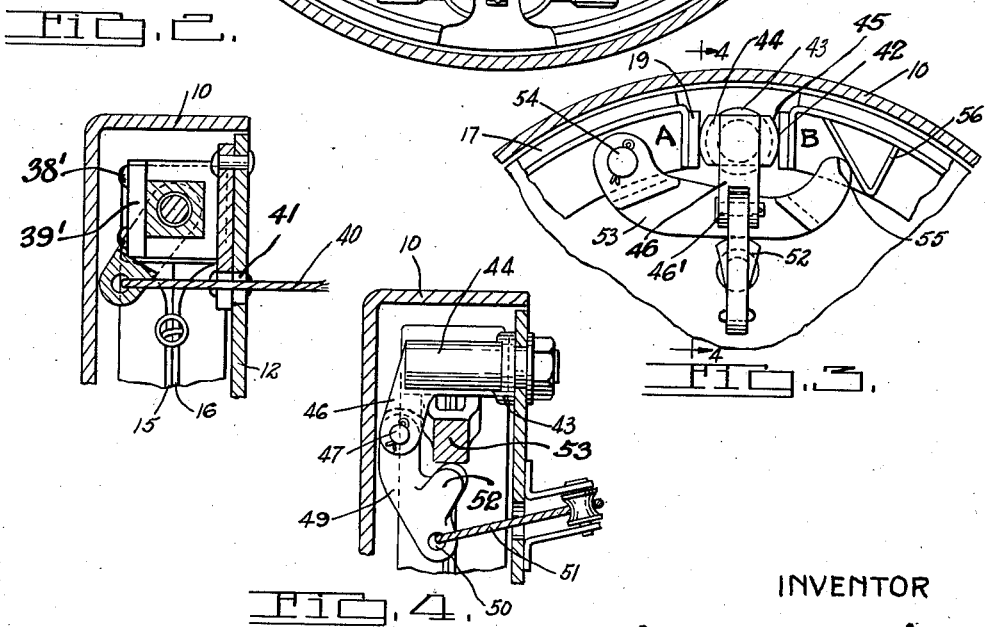
INVENTOR
Montgomery W. McConkey Patented Feb. 26, 1935

1,992,226

UNITED STATES PATENT OFFICE 1,992,226

BRAKE

Montgomery W. McConkey, South Bend, Ind., assignor to Bendix Brake Company, South Bend, Ind., a corporation of Illinois Application June 18, 1928, Serial No. 286,203

23 Claims. (Cl. 188—78)

This invention relates to brakes and is illustrated as embodied in a novel self-energizing type of internal expanding automobile brake. An object of the invention is to improve the operating and anchoring means of the brake and to facilitate its adjustment.

A further object of the invention is to provide a brake applying means of simple and effective construction comprising a flexible tension element passing through the brake housing in a direction generally perpendicular thereto and connected, within the housing, to a lever applying mechanism arranged to actuate the brake. An important feature of the applying mechanism resides in its shifting action, at least in part, permitting either end of the brake friction means to anchor upon a fixed part, the anchoring end determined by the direction of rotation of the brake drum.

A further feature resides in the equalizing function of the shiftable lever mechanism whereby equal applying pressures are transmitted by said mechanism to the opposite ends of the friction means, which function in no wise interferes with the anchoring of said friction means on the anchor or fixed part.

Other objects and minor but important features of the invention include, in one embodiment thereof, a novel floating and shiftable applying lever which may be provided with adjustable means on its ends, said means slidingly fitted in an anchorage fixed to the brake housing. In this arrangement, adjustment of either lever end compensates for lining wear, which adjustment affects in no manner the anchoring of the friction means to the fixed pivot when in operation, nor does it affect the equalizing function of the floating lever.

In another embodiment the shiftable applying lever is preferably pivoted at one end to one end of the friction means and has a sliding loose contact at its other end with the remaining end of the friction means, the lever being actuated by a supplemental lever preferably pivoted to the anchorage. In this embodiment the friction means, which may comprise the usual shoes, is lifted bodily by the supplemental lever into drum engagement, both ends of the friction means remaining anchored by virtue of the retracting action of the return springs. After the drum engagement the lever mechanism continues to force the friction means into drum contact aided by the wiping action of the revolving drum, which action serves to anchor one of the ends of the said friction means to the anchorage, the remaining end leaving the anchor in the operation.

The above and other objects and features of the invention will be apparent from the following description of the embodiments shown in the accompanying drawing, in which:

Figure 1 is a vertical section through the brake taken just inside the wheel showing the novel applying structure in section and the friction means in elevation;

Figure 2 is a transverse section through the applying structure taken on line 2—2 of Figure 1;

Figure 3 is a fragmentary view similar to Figure 1 showing in elevation a modified form of applying means; and Figure 4 is a section taken substantially on the line 4—4 of Figure 3.

In the embodiment selected for illustration, 10 indicates the brake drum, at the open side of which is a support such as a backing plate 12 and within which is the friction means preferably of the floating type such as arcuate shoes 13 and 14. Each shoe may, as illustrated, comprise two right angle sections 15 and 16 arranged back to back with their web portions abutting and may be faced with suitable brake lining 17 and provided, at their brake operating ends, with abutting transversely extending flanges 18 having a cam engaging thrust plate 19 secured thereto. The shoes are applied against the resistance of suitable return springs 20 and 21 with a suitable eccentric stop 22 determining the relative idle position of the friction means and drum.

In the embodiments illustrated, the articulated joint between the shoes may comprise a right and left threaded member 23 threaded into semi-cylindrical thrust members 24 engaging the ends of the shoes. The member 23 extends loosely into sockets formed between stampings 25 projection-welded to the shoe webs. This particular joint is of the same general type as fully described and claimed in application No. 260,858, of March 12, 1928.

The inventive novelty has to do with the brake applying mechanism in which a laterally movable lever actuated through the intermediary of a flexible tension element serves as a cam to apply the brake. In the embodiment illustrated in Figures 1 and 2, the applying structure is interposed between the thrust plates 19 and comprises a carrier bracket 28, generally rectangular in outline, rigidly secured to the backing plate 12. Lever 30 supported on said bracket may be provided with suitably connected oppositely extending arms 31 and 32 oppositely threaded, which arms extend into correspondingly threaded non-circular shaped thrust nuts 34 and 36. The thrust nuts are preferably square in outline and are adapted to slide in correspondingly shaped openings in guides 38 and 39 projecting from the opposite ends of the bracket. The thrust nuts are preferably retained in their respective guide members by a generally rectangular shaped strap 39' detachably secured to the guides by machine screws 38' or other suitable fastenings. The lever 30 is actuated by a tension element 40 connected thereto, which preferably comprises a cable extending generally perpendicular to the plane of the backing plate and passes through a slot 41 in the same to permit lateral play of the cable.

In operation, lateral movement of the tension element 40 effects a rotary movement to the lever 30 which, in turn, forces the thrust nuts 34 and 36 in opposite directions to contact with thrust plate 19, forcing the floating shoes of the friction means into drum engagement against the action of the return springs.

Once into drum engagement the friction means is immediately urged by the revolving drum in clockwise or counterclockwise direction, depending upon the rotation of the drum and anchors respectively at either end of the friction means upon the adjacent anchorage. It is to be noted that the lever is floating with respect to its carrier bracket housing, by virtue of which, it distributes its actuating force equally upon the respective ends of the friction means, irrespective of the position of the same, whether anchored or unanchored upon the anchoring bracket. The particular structure disclosed also permits, if desired, of an adjustment for lining wear, in that one or both of the thrust nuts may be initially extended upon their respective lever arms, thus increasing the distance between the thrust plates 19 to compensate for said wear. This adjustment, together with adjustments made by the eccentric stop 22 and novel joint 23, provides ample means for take-up due to the lining wear.

In the embodiment disclosed in Figures 3 and 4, the thrust plates 19 of the friction means anchor against an abutment 42, preferably cylindrical in shape, at 43 and provided with an outwardly extending substantially rectangular shaped anchoring part 44 having rounded ends 45. The abutment may further be provided with an outwardly and downwardly extending projection 46 having a bifurcated end 46' to which is pivoted, preferably by a pin 47, the end of a novel angularly shaped actuating lever 49, orificed at one end 50 to accommodate a suitable tension element 51 such as a cable and provided, intermediate its ends, with an upstanding boss 52 preferably shaped as a sector of a sphere.

Lever 49 is adapted to actuate a supplemental lever 53 resting upon boss 52 bifurcated at both of its curved ends to straddle the web portion of the friction means. One end of lever 53 is preferably anchored by pin 54 passing through the web while the remaining end has its furcations rounded at 55 disconnectedly engaging, by sliding contact, with suitable angularly extending stampings 56, serving as cam followers, one of such followers being positioned on each side of the web.

In operation, movement of the tension element actuates lever 49 which in turn lifts the lever 53 and the spring contracted friction means bodily upwardly until the drum is contacted, whereupon the action of the revolving drum will cause one of the two friction means to remain anchored upon the abutment 42, the movable end to be determined by the direction of rotation of the drum. With the drum turning in a clockwise direction, the end indicated at "A" in Figure 3 will anchor, end "B" leaving the abutment, subsequent applying pressure forcing lever 53 to ride on the rounded nosed ends 55 up the inclined stops 56, the lever fulcruming at the pin 54. With the reverse movement of the drum, end "B" will remain anchored, end "A" leaving the abutment, subsequent applying pressure giving to the lever 53 a moving fulcruming pressure about the junction of the nose and stop as the nose rides upon the same.

In both embodiments I have provided simple, but withal effective applying mechanism so constructed as to facilitate adjustment and removal of the several parts and permitting a selective anchoring of the friction means unaffected by the applying function.

While several illustrative embodiments have been described in detail, it is not my intention to limit the scope of the invention to its particular embodiments or otherwise than by the terms of the appended claims.

I claim:

1. A brake comprising, a rotatable drum, an anchor associated therewith, a floating friction device engageable with the drum having one part adapted to engage the anchor when the drum is turning in one direction and another part adapted to engage the anchor when the drum is turning in the other direction, a floating means supported by the anchor and arranged to apply said friction device and including an operating lever within the brake and swinging in a plane at right angles to the plane of the brake.

2. In a brake assembly, a floating friction device having separable ends, a fixed abutment arranged to take the torque of the friction means, a floating rigid lever supported by said abutment and members on said lever directly engaging said ends operable to force them apart to apply to friction device, said lever being within the brake and swinging in a plane at right angles to the plane of the brake.

3. A brake comprising, in combination, a drum, friction means within the drum having separable ends, a fixed anchor arranged to take the torque of the friction means, and a rigid lever supported by the anchor having adjustable parts engaging said ends and a laterally movable portion extending inwardly of the drum.

4. A brake comprising, in combination, a drum, an anchor, a friction member within the drum having separable ends adapted to engage said anchor, together with means to render said friction member operative comprising a lever having right and left threaded portions provided with thrust nuts slidable on said anchor, said lever constructed to operate the ends of said member and apply equal pressures thereto.

5. A brake comprising, in combination, a drum, an anchor associated therewith, a friction member engageable with the drum having movable ends adapted to engage the anchor, together with means to render said friction member operative comprising a right and left threaded lever provided with thrust nuts slidably supported on the anchor, said lever constructed to operate the ends of said member and apply equal pressures thereto, and flexible tension means arranged to operate said lever.

6. In a brake assembly, an anchor, a retarding device having movable ends adapted to engage said anchor and means to operate the retarding device comprising a generally T-shaped lever having adjustable thrust nuts on its ends slidably supported on said anchor.

7. In a brake assembly, a fixed guide, a retarding device having movable ends and means to operate the same comprising a generally T-shaped lever, said lever laterally shiftable in said fixed guide and having a floating relation thereto whereby application of the lever serves to distribute equal pressures to the movable ends of the retarding device.

8. A brake comprising, in combination, a drum, an anchor associated therewith, friction means within the drum adapted to engage said anchor, an applying means for the friction means including a generally T-shaped lever threaded at the ends of the laterally extending part thereof, said threads being right and left threaded respectively and members positioned for travel on the threaded parts and supported for movement on the anchor.

9. A brake comprising, in combination, a drum, a fixed anchor member at one side of the drum, a floating expansible friction member within the drum having the anchor between its ends and a generally T-shaped lever member supported by the anchor and arranged to expand said ends into drum engagement, substantially simultaneously with equal pressures upon said ends and providing for shifting of the friction member to engage at least one of said ends with said fixed anchor.

10. A brake comprising, in combination, a fixed anchor having spaced guides thereon, a floating friction device having separable ends, a generally T-shaped applying lever provided with a thrust nut threaded on each end of the laterally extending arm and slidably supported by said guides, said lever arranged to apply substantially equal expanding pressures on said ends and permit at the same time one of said ends to anchor on one of the guides on said anchorage.

11. A brake comprising, in combination, a fixed anchorage comprising a laterally extending guide on each end thereof, floating retarding means having separable ends adapted to transmit the braking torque to said anchorage, a generally T-shaped applying lever provided with thrust nuts threaded on its laterally extending arm, said nuts extending within said guides and contacting with said separable ends, said lever floating with respect to said anchorage and adapted, when actuated, to transmit equal brake applying pressures to said separable ends and because of its floating relation to permit the retarding device to anchor on one of said guides.

12. A brake assembly comprising, in combination, a torque taking substantially rectangular anchorage member comprising laterally extending arms adapted to serve as guides.

13. The combination with a torque-taking fixed part provided with laterally extending guides, of a substantially T-shaped lever member fitting within said guides.

14. In a brake assembly including a backing plate, the combination with a lever member within the brake extending substantially parallel with said plate and swinging in a plane perpendicular to said plate of a flexible tensioning member connected to said lever and extending through said plate and in a direction generally perpendicular to said plate, a brake anchorage adjacent said lever, and shiftable friction means having adjacent ends acted on by said lever and one or the other of which ends alternatively anchors on said brake anchorage.

15. A brake comprising, in combination, a drum and backing plate therefor, an abutment fixed to said plate, floating retarding means arranged within said drum, lever means in two parts extending substantially at right angles to each other, said lever means constructed to bodily lift said retarding means into drum engagement, which then anchors at one of its ends on said abutment.

16. A brake comprising, in combination, a drum, a fixed part, a floating retarding device within said drum adapted to anchor at one end on said part when the drum is turning in one direction and at its other end when the drum is turning in the reverse direction, a two part lever mechanism arranged to apply equal pressures at all times to the two ends of said retarding device, permitting at the same time the anchoring function of the same, the two parts of said lever mechanism extending substantially at right angles to each other.

17. A brake comprising a drum, anchorage means, friction means having one part anchoring thereon in one direction of drum rotation and a different part anchoring thereon in the other direction of drum rotation, and right-and-left threaded applying means acting on the friction means and arranged adjacent the anchorage means.

18. A brake comprising a drum, anchorage means, friction means having one part anchoring thereon in one direction of drum rotation and a different part anchoring thereon in the other direction of drum rotation, and applying means expansible along a chord of the drum and acting on the friction means and slidably mounted in the anchorage means for rectilinear movement along said chord of the drum.

19. A brake comprising friction means having separable ends and having anchorage means acting on said ends, threaded members acting respectively on said ends, and a right-and-left threaded applying device meshing with and acting on said members and operable to apply the friction means with either of its ends anchored.

20. An applying device for a brake or the like comprising a bracket having spaced aligned bearings, thrust members slidably supported in said bearings, and means mechanically connecting said members and operable to force them slidably apart in said bearings to apply the brake in combination with friction means actuated by the applying device and arranged to anchor on said bearings.

21. A brake comprising a bracket having spaced aligned bearings, thrust members slidably supported in said bearings, means mechanically connecting said members and operable to force them slidably apart in said bearings to apply the brake, and friction means acted on by the thrust members and anchoring on said bracket.

22. A brake having a drum, a support at the open side of the drum, friction means within the drum arranged to anchor at one end when the drum is turning in one direction and at the other end when the drum is turning in the other direction, and a floating operating assembly acting on said ends to apply the brake and permitting anchorage at either of said ends and comprising a pair of members acting on the ends of the friction means and a part between and operable to force them apart and which part has a lever inside the brake swinging in a plane at right angles to the plane of the support, and a tension element for operating said lever and attached thereto and passing through the support.

23. A brake comprising a drum, friction means having one part which anchors when the drum is turning in one direction and having a different part which anchors when the drum is turning in the other direction, and an applying device shiftable bodily to allow either of said parts to anchor and including thrust members acting respectively on the ends of the friction means and a rotatable actuator carried by said members and operable to force them in opposite directions to apply the brake.

MONTGOMERY W. McCONKEY.